(12) United States Patent
Kurecka et al.

(10) Patent No.: US 6,554,714 B2
(45) Date of Patent: Apr. 29, 2003

(54) BORON CARBIDE ALUMINUM DRIVESHAFT TUBE

(75) Inventors: Donald Joseph Kurecka, Rochester Hills, MI (US); Karthik Sivakumar, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/877,969

(22) Filed: Jun. 8, 2001

(65) Prior Publication Data

US 2003/0013535 A1 Jan. 16, 2003

(51) Int. Cl.[7] ................................. F16C 3/02
(52) U.S. Cl. ........................ 464/183; 464/902
(58) Field of Search ......................... 464/183, 902, 464/903; 428/34.4; 138/178; 75/236, 244

(56) References Cited

U.S. PATENT DOCUMENTS 4,834,693 A * 5/1989 Profant et al. .............. 464/183
5,363,929 A * 11/1994 Williams et al. .......... 464/181 X
5,486,223 A    1/1996 Carden
5,672,286 A    9/1997 Seeds
5,904,622 A * 5/1999 Breese et al. ............ 464/903 X
5,980,602 A   11/1999 Carden

OTHER PUBLICATIONS

Universal Joint and Driveshaft Design Manual, Advances in Engineering Series No. 7, Society of Automotive Engineers, Warrendale, PA, p. 375, TJ1079.S62 1979.*

* cited by examiner

Primary Examiner—Greg Binda
(74) Attorney, Agent, or Firm—Harness, Dickey & Pierce P.L.C.

(57) ABSTRACT

The invention provides a tube assembly containing an extruded torque tube (12) and two yokes (14) welded to either end of the tube. The tube is made from a base material metal and boron carbide particles in a ratio of approximately between 2:1 to 10:1 by weight. In another embodiment, a driveshaft assembly includes the above tube assembly with a front universal joint (24) and slip yoke (26) attached to a front end, and a rear universal joint (22) attached to a rear end. An axle yoke (28) is coupled at the rear universal joint (22).

18 Claims, 1 Drawing Sheet

BORON CARBIDE ALUMINUM DRIVESHAFT TUBE

FIELD OF THE INVENTION

The invention relates to a boron carbide aluminum driveshaft tube. More specifically, it relates to driveshafts where the tubes are designed to achieve a desired level of physical properties for use in automotive applications.

BACKGROUND OF THE INVENTION

Automotive driveshafts are carefully engineered to meet vehicle requirements. For example, driveshafts must withstand torque developed by the engine and transfer the torque to the drive wheels. Driveshafts must be sufficiently fatigue resistant to operate over the service life of the vehicle. Furthermore, the dimensions of the driveshafts, as well as their material compositions, are carefully designed in order to minimize vehicle weight and simplify vehicle design.

Metal matrix composites have become more practical and accepted for use in extruded driveshaft tubes. A commonly used material is aluminum metal matrix composite. This material includes particles of aluminum oxide in an aluminum alloy matrix. Such materials may be more difficult to weld, but are stronger and lighter than ordinary aluminum alloys.

U.S. Pat. No. 5,486,223 to Carden discloses a metal matrix composite that utilizes boron carbide as the ceramic additive to a base material metal. Carden discloses the use of the composite for the manufacture of structural members, with no suggestion to produce high performance extruded rotating members such as torque tubes for driveshafts.

Balancing of a driveshaft is a very important design requirement. In order to achieve a high degree of balance, the driveshaft tube is extruded with very close tolerances for straightness and circularity. After extrusion, the tube is typically taken up on rollers to achieve the final required dimensions. But even with careful workmanship, the center of mass of a rotating shaft never coincides perfectly with its axis of rotation. An imbalance results from this lack of coincidence. The imbalance generates a centrifugal force as the driveshaft rotates. The strength of the force increases as speed increases. At higher speeds, and thus at higher centrifugal forces, the imbalance can cause the shaft to deflect. In practice the effect of an imbalance can be minimized by adding balancing weights to the driveshaft assembly. Balancing of the driveshaft assembly also compensates for imbalances in the other driveshaft components.

Aside from the imbalance, every driveshaft has a critical speed at which the shaft exhibits resonance frequencies. That is, even when the imbalance problem is minimized by careful spin balancing of the driveshaft assembly, there is still a maximum speed that the driveshaft can rotate. At a critical speed, the shaft attempts to rotate both about its geometrical axis, and about the axis through its center of mass. Thus, driveshafts are designed to operate below this critical speed.

Automobiles consist of hundreds of component parts, all of which are packaged together in a vehicle to provide reliable and economical performance. Modern automotive design concepts place a premium on the efficient use of space, with an eye toward efficiency in manufacturing and an overall reduction in size and weight. The components must fit together within tight restraints relative to each other, with little flexibility for changing the dimensions of components once the overall design is set. The way the components fit together within tight restraints and close dimensions is referred to as packaging.

It is often necessary or desirable during the automotive design process to redesign parts at the last minute to accommodate material substitutions, increased demands for performance, enhanced availability of options for the consumer, or to take advantage of an increased performance available from new materials. It would be most desirable if such design changes could be accomplished with as little change to the packaging as possible.

Automotive driveshafts must often be designed and re-designed to accommodate changes in the design of the drive train. For example, if a new engine option is offered, the driveshaft must be changed so that the new torque requirements may be met. This can involve changing the outer and inner radii of the torque tube. However, changing the outer diameter of the tube leads to difficulties fitting the new re-designed tube within the packaging environment. Alternatively, it may be possible to reformulate the material of the tubes to accomplish a driveshaft with the same dimensions, but with different physical properties. However, this is not usually feasible because the reformulation would require a new ladle pour with its concomitant high expense and slow turn around time.

Thus, there is a need for a simplified way to deal with rapid changes in engineering requirements in the framework of packaging constraints in automobiles. The present invention provides such a solution.

SUMMARY OF THE INVENTION

In one embodiment, the invention provides a tube assembly containing an extruded torque tube and two end fittings such as yokes welded or otherwise attached to either end of the tube. The tube is made from a base material metal and boron carbide particles in a ratio of approximately between 2:1 to 10:1 by weight. In another embodiment, a driveshaft assembly includes the tube assembly above with a front universal joint and slip yoke attached to the front end, and a rear universal joint attached to the rear end. Additional objects and advantages of the invention will become apparent from the following detailed description of the preferred embodiment, the appended claims and accompanying drawings, or may be learned by practice of the invention.

DESCRIPTION OF THE INVENTION

Figure 1:
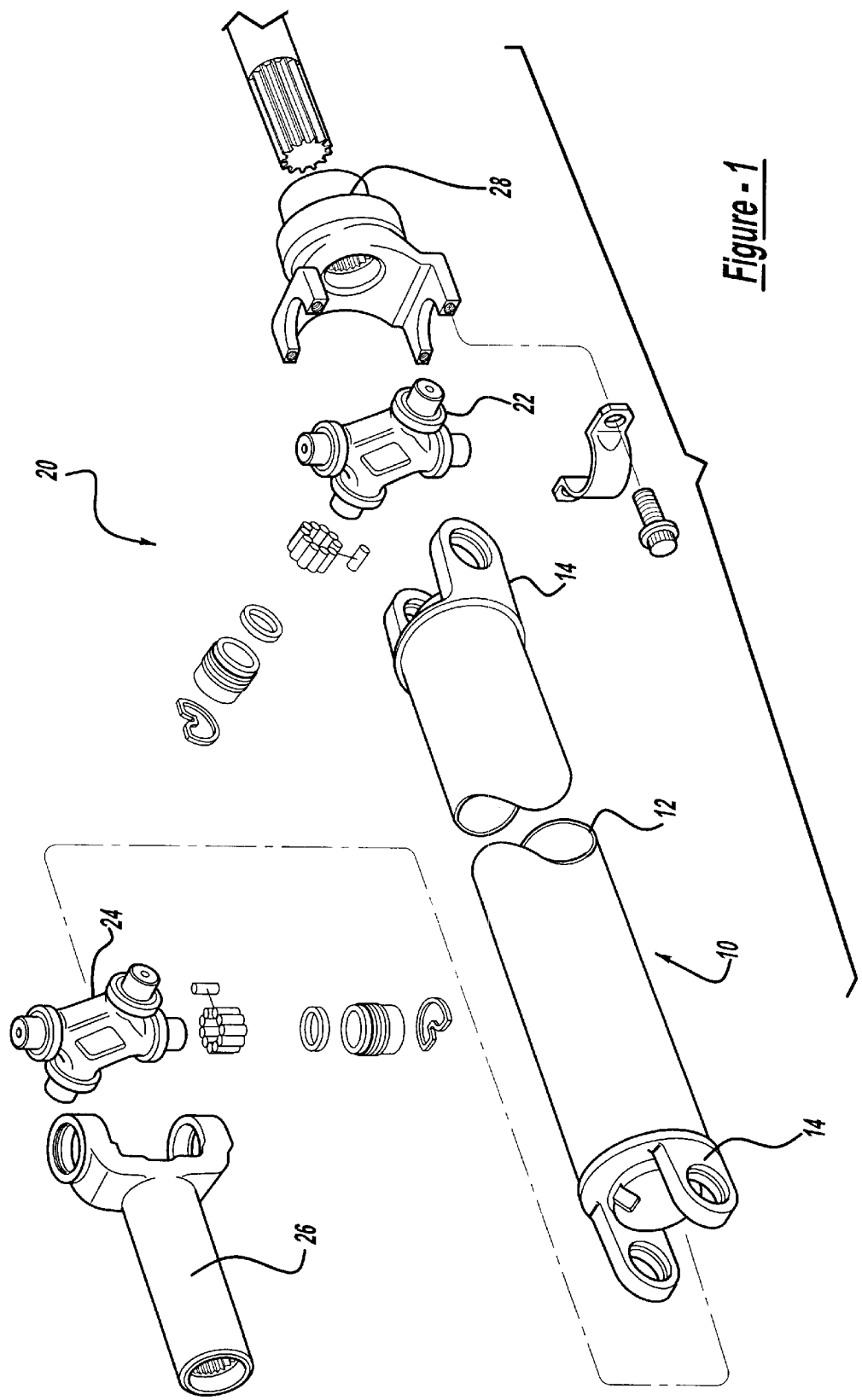
FIG. 1 illustrates schematically one embodiment of a driveshaft assembly of the current invention.

Referring to FIG. 1, one embodiment of a tube assembly 10 is shown that is made up of a torque tube 12 having weld yokes 14 at each end for installing the tube assembly 10 in a motor vehicle. The driveshaft assembly 20 also has a rear universal joint 22 and a front universal joint 24 attached to the respective weld yokes 14 on the torque tube 12. To complete the driveshaft ass to the front universal joint 24. The driveshaft assembly 20 is coupled to an axle yoke 28 at the rear universal joint 22.

In the embodiment of FIG. 1, the weld yokes 14 may be welded to the torque tube 12 using known methods. For example, the ends of the tube may be pressed onto an annular end portion of a yoke to form a narrow slit. Then the parts are welded by forming an electric arc between the parts and a consumable aluminum based electrode, in a method such as described in Seeds, U.S. Pat. No. 5,672,286, the specification and drawings of which are expressly incorporated by reference.

In addition to the weld yokes illustrated in FIG. 1, other conventional end fittings can be attached to the torque tube 12. Examples include, without limitation, external spine shafts, flanged yokes, external stub shafts, slip flanges, CV joints, double Cardan joints, and sleeve couplings. The end fittings can be used in any possible combinations and/or with a weld yoke.

The torque tube 12 is made of a composite containing a base material metal and boron carbide, such as described in Carden, U.S. Pat. No. 5,980,602, the specification and drawings of which are expressly incorporated by reference. The ratio of base metal material to boron carbide particles is from about 2:1 to 10:1 by weight, preferably from about 4:1 to 10:1 by weight. These ratios correspond to a percent by weight boron carbide content from about 9% to 33%, preferably from about 9% to 20%.

The base material metal of the composite is aluminum, magnesium, titanium, or alloys thereof. Preferably the base material is aluminum or an aluminum alloy. The base material metal is provided in powder form and is preferably approximately 97% pure. The balance of the material can contain various trace metals such as chromium, copper, iron, magnesium, silicon, titanium, and zinc.

The boron carbide powder in the composite is preferably 99.5% pure boron carbide having a particulate size in the range of 2–19 microns with a mean or average size of approximately 8.4 microns. In a typical embodiment, the base material metal is an aluminum alloy to which approximately 9%–33%, preferably about 9% –20% by weight of boron carbide powder is added. The boron carbide added to the base material metal can also contain silicon in an amount of 0.1% –0.4%, iron in the amount of 0.05% –0.4% and aluminum in the amount of 0.05–0.4%.

A metal matrix composite made from the above materials in accordance with the fabrication process of the present invention described later, typically may be approximately as hard as chromalloy steel but have a density lower than that of aluminum alloy.

The addition of small amounts of pure aluminum, silicon, and iron to the arc furnace during the production of boron carbide, such as by the reaction of boric acid and carbon, has been found to improve the boron carbide for use in the metal matrix composite. These elements are usually present in the boron carbide in an amount less than 3% by weight. The elements do not go out of solution. The elements stay in the boron carbide and provide a chelating opportunity for the base material aluminum. These additional elements form an intermetallic chemical bond with the main metal alloy. Other elements that can be added to the arc furnace during production of boron carbide include virtually any low temperature reacting metal that forms an intermetallic phase below the processing temperature of the metal matrix composite ingot would be useable in the present invention. In a preferred embodiment, the metal matrix composite tube comprises up to 1.5% by weight of at least one metal additive having an intermetallic phase temperature lower than the melting point of the base material metal.

Torque tubes of the invention can be produced by extrusion from an ingot containing the metal matrix composite described above. In one aspect of the invention, the ingots can be prepared by a molten process. In a preferred embodiment, the ingots are made by powder metallury.

In a non-limiting example of a powder metallurgy process, fabrication of the metal matrix composite of the present invention involves blending of powders of all the various elements such as by means of a jet mill. The jet mill is basically an air blaster used to uniformly mix powdered substances and avoid stratification and settling. After the particles have been sufficiently mixed, they are directed into a die and then into a cylindrical container where the particles are subjected to extremely high pressures, transforming the elements into a solid ingot.

The torque tubes of the invention can be extruded from the ingot. Extrusion of the tubes is accomplished by known methods, such as port hole extrusion or seamless extrusion processes.

In another embodiment, the invention provides a method for accommodating changes in critical speed requirements of a driveshaft assembly. It is preferable to accommodate the changes without increasing the diameter of the tube so that the redesigned part fits into the packaging requirements of the vehicle.

In addition to torque, fatigue, and mass, requirements, driveshafts have another design requirement. The critical speed at which the shaft becomes dynamically unstable must be considered. The critical speed of the driveshaft must be higher than the maximum rpm generated by the engine, plus an additional safety factor.

In an automotive driveshaft, the stiffness of the material in the torque tube directly affects the value of the critical speed. Critical speed is a function of both the driveshaft geometry and material properties. The engineering formula for critical speed $N_c$ is $$N_c = 30\pi \sqrt{\frac{EIg}{WL^3}} \qquad (1)$$

wherein

E is the elastic modulus of the torque tube

I is the second moment of area g is the acceleration due to gravity,

W is the weight of the shaft

L is the length of the shaft

The above formula can be rewritten to express the critical speed as $$N_c = \frac{15\pi}{L^2} \sqrt{\frac{(E)g(R_0^2 + R_i^2)}{p}} \qquad (2)$$

wherein p is the density of the material in the shaft, $R_0$ is the outer radius, and $R_i$ is the inner radius. The parameter E/p is known as the specific stiffness.

From equations 1 and 2 it is seen that one way to increase the critical speed of a shaft is to change the geometry. That is by making the shaft shorter or by increasing the diameter, the critical speed will increase. Such changes in geometry are usually not possible because for automotive driveshaft applications the packaging envelope usually restricts the range of geometry changes.

As seen from the equations above, an increase in specific stiffness of the torque tube material results in an increase in the critical speed of the shaft.

In the boron carbide aluminum torque tubes of the invention, the specific stiffness is generally a function of the boron carbide content of the composite material. As an example, the relationship of stiffness to boron carbide content in a series of composites marketed by Alyn Corporation under the Boralyn® name is illustrated in the table.

TABLE 1

| Alloy | Weight % Boron Carbide | Density (lb/in³) | Elastic Modulus ($10^6$ lb/in²) | Specific Stiffness ($10^8$ in.) |
|---|---|---|---|---|
| 1 | 9.4 | 0.097 | 12.5 | 1.29 |
| 2 | 14.1 | 0.097 | 14.5 | 1.49 |
| 3 | 18.9 | 0.096 | 15.5 | 1.61 |

The specific stiffness is given by dividing the elastic modulus by the density. The specific stiffness varies over a wide range as a function of small changes in the alloy composition. The data in the table are illustrative only. Other suppliers may offer composites with a slightly different dependence of specific stiffness on boron carbide content.

As mentioned above, the problem to be solved by the invention arises for example when a driveshaft has been designed to have a critical speed suitable for the performance characteristics of the vehicle in which it is installed. Such a shaft is characterized by an outer diameter and by inner and outer radii of the torque tube. Then a design change necessitates changing the critical speed. The design change for example, may be in response to an engine option added for the consumer. The problem is most difficult to solve when the new critical speed necessitated by the design change is greater than the original critical speed of the part. In such a situation, the new critical speed can be accommodated by changing the geometry of the shaft to make it either shorter or larger in diameter or outer radius. However, as discussed earlier, this is usually not desirable because the packaging envelope into which the redesigned driveshaft must fit usually does not allow for large changes in dimensions of the driveshaft.

The solution is found by taking advantage of the dependence of the specific stiffness on the content of boron carbide in the composite. That is, one takes as given a desired diameter and wall thickness of a redesigned driveshaft. In a preferred embodiment, the desired diameter of the redesigned torque tube is equal to or less than the diameter of the original tube. Thereafter, one calculates from formula 1 or 2 a desired value of specific stiffness in a metal matrix composite tube of the invention in order that a torque tube may be provided with the desired critical speed given the diameter or radius constraints. Thereafter one determines, by interpolation from the table, the concentration of boron carbide required in a base metal alloy to achieve the desired value of specific stiffness in light of the diameter and radius constraints. Then a tube having the required outer diameter, inner diameter and wall thickness is extruded from a composition comprising the base metal and the required concentration of boron carbide. This extruded tube can then be incorporated as a torque tube into a second tube assembly and driveshaft assembly which meet the new critical speed requirements given the radius and diameter constraints.

EXAMPLE

An automobile designed to be sold predominantly in North American market has an engine with typically high horsepower. The engine is run optimally at lower engine speeds (RPMs). A driveshaft was designed with a one piece steel torque tube that met all the customer requirements. Engineering calculations and laboratory testing determined a critical speed requirement of 10,125 RPM, including a safety factor. The steel torque tube had a critical speed above this requirement.

This design was approved and almost completely validated both in the testing labs and at the proving grounds. At this juncture, a high-speed engine, capable of running at higher engine RPMs, was introduced into the program. Upon re-calculating the requirements for the engine, it was found that the critical speed requirement of the driveshaft had increased to 11,375 RPM, with a safety factor. The existing driveshaft based on a steel torque tube could not meet the critical speed requirements for the new engine. Changing the dimensions of the steel torque tube was not possible because of packaging constraints in the vehicle.

Replacing the steel torque tube with one of aluminum was not satisfactory because the aluminum driveshaft had even lower critical speed than the steel driveshaft. Further, the vehicle had not been designed with a cross-member, and it was too late in the program and expensive to incorporate a chassis change. Therefore, it was not possible to solve the problem by designing a 2-piece driveshaft with a center bearing assembly, because the center bearing could not be mounted in the vehicle chassis configuration.

The problem is solved by designing a driveshaft with a torque tube made from a boron carbide aluminum metal matrix composite. A composite tube designed for the application will meet the higher critical speed requirements as well as the packaging requirements.

The first torque tube had an inner radius of 48.7 mm, an outer radius of 50.8, a length of 1200 mm, and a critical speed of 10,125 RPM. The desired critical speed of a re-designed driveshaft was to be 11,375 rpm. The desired wall thickness of the redesigned torque tube was estimated to about 2.11 mm. The outer diameter was to remain the same as that of the first tube, or 101.6 mm. Likewise the length of the new tube was to remain the same as that of the original, or 1200 mm. From equations 1 and 2, it is calculated that such a re-designed tube must have a specific stiffness of at least $1.36 \times 10^8$ inches to achieve a critical speed of 11,375 rpm.

From Table 1, using non-linear interpolation, it can be calculated that a boron carbide aluminum tube of the desired specific thickness can be extruded in the desired dimensions if the boron carbide concentration in the base metal is selected to be 12% by weight or greater. Accordingly, a powder composition is made containing 88% by weight aluminum alloy powder and 12% by weight jet milled boron carbide particles. The composition is pressed into an ingot for extrusion, in a manner described above. Thereafter, a tube having the required concentration of boron carbide is extruded from the ingot. The extruded tube is then incorporated as a torque tube into the redesigned driveshaft assembly. The driveshaft: assembly containing the torque tube is spin balanced prior to shipment to the customer.

The re-designed driveshaft assembly can be installed within the packaging constraints of the vehicle. The new driveshaft has sufficiently high critical speed to accommodate the requirement of 11,375 rpm.

What is claimed is:

1. A tube assembly comprising:
   an extruded metal matrix composite dynamic torque tube having a front end and a rear end; and
   end fittings attached to the front and rear ends of the torque tube; wherein the end fittings on the front and rear ends of the tube may be the same or different, and are selected from the group consisting of external spline shafts, flanged yokes, external stub shafts, slip flanges, CV joints, double Cardan joints, sleeve couplings, weld yokes, and combinations thereof, and wherein the tube comprises a base material metal and boron carbide particles in a ratio of approximately between 2:1 to 10:1 by weight, and the base material metal is selected from the group consisting of aluminum, titanium, and alloys thereof.

2. A tube assembly according to claim 1, wherein the end fittings comprise at least one weld yoke.

3. A tube assembly according to claim 1, wherein the base material metal comprises aluminum or an aluminum alloy.

4. A tube assembly according to claim 3, wherein the boron carbide particles range in size from about 2 microns to about 19 microns.

5. A tube assembly according to claim 3, wherein the base material metal is at least 97% pure and the boron carbide is at least 99.5% pure.

6. A tube assembly according to claim 3, wherein the metal matrix composite tube further comprises up to 1.5% by weight of at least one metal additive having an inter-metallic phase temperature lower than the melting point of the base material metal.

7. A tube assembly according to claim 6, wherein the metal additive is selected from the group consisting of silicon, iron, aluminum, and titanium, and mixtures thereof.

8. A tube assembly according to claim 1, wherein the ratio of base material metal to boron carbide in the metal matrix composite tube is between 4:1 and 10:1 by weight.

9. A driveshaft assembly, comprising:
an extruded dynamic torque tube having a front end and a rear end;
two end fittings attached to the front and rear ends of the tube;
a front universal joint attached to the fitting on the front end;
a rear universal joint attached to the fitting on the rear end; and
a slip yoke coupled to the front universal joint;
wherein the dynamic torque tube is made of a metal matrix composite comprising a base material metal and boron carbide particles in a ratio by weight of approximately between 2:1 and 10:1, wherein the base material metal is selected from the group consisting of aluminum, titanium, and alloys thereof.

10. A driveshaft assembly according to claim 9, wherein the end fittings on the front and rear ends of the tube may be the same or different, and are selected from the group consisting of external spline shafts, flanged yokes, external stub shafts, slip flanges, CV joints, double Cardan joints, sleeve couplings, weld yokes, and combinations thereof.

11. A driveshaft assembly according to claim 9, wherein the end fittings comprise at least one weld yoke.

12. A driveshaft assembly according to claim 9, wherein the boron carbide particles range in size from about 2 microns to about 19 microns.

13. A driveshaft assembly according to claim 9, wherein the base material metal comprises aluminum or an aluminum alloy.

14. A driveshaft assembly according to claim 13, wherein the base material metal is at least 97% pure, and the boron carbide is at least 99.5% pure.

15. A driveshaft assembly according to claim 13, wherein the metal matrix composite tube further comprises up to 1.5% by weight of at least one metal additive having an inter-metallic phase temperature lower than the melting point of the base material metal.

16. A driveshaft assembly according to claim 15, wherein the metal additive is selected from the group consisting of silicon, iron, aluminum, titanium, and mixtures thereof.

17. A driveshaft assembly according to claim 9, wherein the ratio of base material metal to boron carbide particles in the metal matrix composite tube is between 4:1 and 10:1 by weight.

18. A driveshaft assembly according to claim 9, further comprising an axle yoke coupled at the rear universal joint.

* * * * *

UNITED STATES PATENT AND TRADEMARK OFFICE
CERTIFICATE OF CORRECTION

PATENT NO.      : 6,554,714 B2
DATED           : April 29, 2003
INVENTOR(S)     : Donald Joseph Kurecka and Karthik Sivakumar It is certified that error appears in the above-identified patent and that said Letters Patent is hereby corrected as shown below:

<u>Column 2,</u>
Line 59, after "driveshaft" delete "ass" and insert
-- assembly, a slip yoke 26 is coupled --

Signed and Sealed this

Sixteenth Day of December, 2003

JAMES E. ROGAN
*Director of the United States Patent and Trademark Office*